(12) United States Patent
Hayashi et al.

(10) Patent No.: US 7,478,477 B2
(45) Date of Patent: Jan. 20, 2009

(54) WOODEN MEMBER FABRICATION METHOD

(75) Inventors: Kentaro Hayashi, Aichi-ken (JP); Yasuo Takasu, Kariya (JP); Satoshi Fukuta, Kariya (JP)

(73) Assignees: Kabushiki Kaisha Tokai-Rika-Denki-Seisakusho, Aichi-ken (JP); Aichi-Prefecture, Aichi-ken (JP)

( * ) Notice: Subject to any disclaimer, the term of this patent is extended or adjusted under 35 U.S.C. 154(b) by 866 days.

(21) Appl. No.: 10/809,937

(22) Filed: Mar. 26, 2004

(65) Prior Publication Data

US 2004/0250501 A1 Dec. 16, 2004

(30) Foreign Application Priority Data

Mar. 28, 2003 (JP) .............................. 2003-090829

(51) Int. Cl.
*B29C 44/06* (2006.01)
(52) U.S. Cl. ........................................ 29/894.1; 74/552
(58) Field of Classification Search .................... 52/300; 74/552, 558, 558.5; 29/894.1
See application file for complete search history.

(56) References Cited

U.S. PATENT DOCUMENTS

| | | | |
|---|---|---|---|
| 1,680,646 A | | 8/1928 | Smith |
| 1,697,616 A | | 1/1929 | Smith |
| 4,375,881 A | * | 3/1983 | Mitchell .................. 248/447.1 |
| 5,072,093 A | * | 12/1991 | Scheuerer .................... 219/204 |
| 5,116,557 A | * | 5/1992 | Debaes et al. .............. 264/46.6 |
| 6,038,770 A | * | 3/2000 | Carrier ...................... 29/894.1 |
| 6,578,448 B2 | * | 6/2003 | Suzuki et al. ................. 74/552 |
| 6,797,087 B2 | * | 9/2004 | Hosokawa et al. ......... 156/73.1 |
| 6,817,100 B2 | * | 11/2004 | Mori et al. ................. 29/894.1 |

FOREIGN PATENT DOCUMENTS

| | | |
|---|---|---|
| JP | 11-180312 | 7/1999 |
| JP | 2000-153515 | 6/2000 |
| JP | 2000-263515 | 9/2000 |

* cited by examiner

*Primary Examiner*—Richard E Chilcot, Jr.
*Assistant Examiner*—Chi Q Nguyen
(74) *Attorney, Agent, or Firm*—Roberts Mlotkowski Safran & Cole, P.C.; Thomas W. Cole

(57) ABSTRACT

A wooden member fabrication method which, by a simple process, can enable greater stability of shape subsequent to processing and uniformity of color tone. A wooden original piece with a long form has a hole thereinside which extends in the length direction. Corner portions are chamfered and radial direction thicknesses are substantially constrained to a certain range. An outer periphery of this wooden original piece is compression-deformed in directions toward an axial central portion and the outer periphery is thus made an arc surface. Because of the chamfering, radial direction thicknesses of the wooden original piece are constrained, and differences by location between compression ratios can be suppressed.

18 Claims, 3 Drawing Sheets

WOODEN MEMBER FABRICATION METHOD

CROSS-REFERENCE TO RELATED APPLICATION

This application claims priority under 35 USC 119 from Japanese Patent Application No. 2003-90829, the disclosure of which is incorporated by reference herein.

BACKGROUND OF THE INVENTION

1. Field of the Invention

The present invention relates to a method for fabricating a wooden member whose outer periphery is an arc surface.

2. Description of the Related Art

Various members are fabricated to serve as wooden members whose outer peripheries are circular surfaces. For example, there is a wood-covered steering wheel at a steering wheel of a vehicle (see, for example, Japanese Patent Application Laid-Open (JP-A) No. 11-180312). At this steering wheel, an outer periphery of an annular wheel ring, which is made of metal, is covered with a wooden member for ornamentation, improving tactile impression, etc. The wooden member has a structure in which a core hole is formed to pass along a circumferential direction of the wheel ring, and which is cut in half. The wooden member is assembled to the wheel ring by superposing and sandwiching the metal wheel ring with the wooden member.

When such a wooden member is to be fabricated, wooden original pieces with a rectangular cross-sectional form are placed in a pressure vessel, and are heated and softened for a predetermined duration in a high-temperature, high-pressure steam atmosphere. Next, the wheel ring is set between these wooden original pieces, and an outer peripheral surface of the wooden original pieces, which is provided with substantially right-angled angle portions, is pressed by a mold. At this time, in order to fix shape changes caused by the molding, this pressed state is maintained continuously for a predetermined duration. However, with such a method for fabricating wooden members, ratios of compression of, for example, angle portions tend to be high. As a result, after this processing, the wooden original piece is susceptible to the occurrence of shape deformation due to moisture absorption. Moreover, locations with higher compression ratios have denser coloring.

There is also a method in which curved surfaces are formed at corner portions of the outer peripheral face of a wooden original piece such that the cross-sectional form of the wooden original piece is substantially a 'U' shape. Thereafter, the outer peripheral surface of the wooden original piece is pressed in a mold, while large differences between thickness dimensions in radial directions of the 'U' shape are retained. However, with this method for fabricating wooden members, there may be cases in which curvature deformation is necessary, but processing to make portions whose shapes are to be altered larger or the like is troublesome. Moreover, cracking may occur during fabrication.

SUMMARY OF THE INVENTION

In light of the circumstances described above, the present invention provides a wooden member fabrication method which is capable, by simple processing, of enabling more stability of form and uniformity of color tone subsequent to the processing.

A first aspect of the present invention provides a wooden member fabrication method which includes steps of: providing a wooden member original with a long form and including a hole thereinside which extends in a length direction, the wooden member including a cross-section perpendicular to the length direction which is substantially a rectangle of which corner portions have been chamfered; and compression-deforming the wooden member original in directions toward a center of the cross-section, for making an outer periphery of the wooden member original an arc surface. Thicknesses in the cross-section are constrained to a predetermined range.

The wooden member fabrication method uses a wooden member original in which corner portions are chamfered and radial direction thicknesses are made substantially equal. An outer periphery of this wooden member original is compression-deformed in directions toward an axial center portion and the outer periphery is made to be a circular arc surface.

According to the first aspect of the present invention, the circular arc surface is formed at the outer periphery by using the wooden member original whose corner portions are chamfered and whose radial direction thicknesses are made substantially equal, and compression-deforming the outer periphery of this wooden member original in the directions toward the axial center portion. Herein, chamfering refers to corner portions of a wooden member that has corners which are cut off in straight lines or curved lines and whose radial direction thicknesses are substantially equal. After the chamfering, radial direction dimensions around the axial center portion are not uniform and matched but are in a state in which large dimensional differences have been eliminated. That is, the radial direction dimensions being substantially equal means a state in which large dimensional differences between the radial direction dimensions about the axial center portion have been removed. Thus, by using the wooden member original which has been chamfered and in which the radial direction thicknesses are substantially equal, compression portions can be made smaller and variations in compression ratios by location can be suppressed, with a simple process. Therefore, after the processing (for example, during usage), the occurrence of shape deformation due to moisture absorption is unlikely, and the form can be made stable. Further, because variations in compression ratios between respective locations are small, a state in which locations with higher ratios of compression are more densely colored is avoided, and the overall color tone can be made uniform. Note that arc surfaces of outer peripheries which are provided by compression-deformation may include, besides circular arc surfaces in which the radius of curvature is a constant value, arc surfaces having two or more different radiuses of curvature.

The present invention can be applied to formation of a wooden member with a divided form for covering a wheel ring of a steering wheel, an outer periphery of the wooden member having been compression-deformed.

When the wooden member is used as a wooden member for a wheel ring, the occurrence of shape deformation due to moisture absorption is unlikely, and the shape can be made stable. Furthermore, because differences in ratios of compression of various portions of the wooden member for the wheel ring are small, overall color tone can be made more uniform, and the wooden member for the wheel ring can be provided with excellent appearance.

In the aspect described above, the angles of obtuse angles that are formed by the chamfering may be between 120° and 150°.

When the angles of the obtuse angles that are formed by the chamfering are between 120° and 150°, it is possible to provide, by extremely simple processing, a more stable shape after processing and more uniform color tone.

In the aspect described above, radial dimension thicknesses may be such that the dimension of a thickest portion is less than or equal to 1.85 times the dimension of a thinnest portion.

When the dimension of the thickest portion is not more than 1.85 times the dimension of the thinnest portion, cracking of the wooden member original at a time of compression can be prevented. That is, if this ratio exceeds 1.85 times, when the thickest portion and the like are compressed, locations at which the largest forces are applied are the thinnest portions, and cracking is likely to occur at these locations. However, when this ratio is 1.85 times or less in the present invention, this can be avoided. Herein, the wooden member original being compressed is generally made thicker in a direction of compression and thinner in a direction perpendicular to the compression direction. Therefore, locations at which the largest forces are applied are often the thinnest portions. Note that the ratio of the thickest portion to the thinnest portion is ordinarily made smaller as a result of being compressed.

A second aspect of the present invention is a wooden member fabrication method which includes steps of: providing a wooden member original with a long form and including a substantially rectangular cross-section; dividing the wooden member original into two segments by a plane which passes along a length direction through a substantial center of the cross-section; forming, at a divided face of each of the two segments, a channel which extends along the length direction; chamfering corner portions of the wooden member original along the length direction for constraining thicknesses of the wooden member original to within a predetermined range; and pressing and joining the two segments such that the divided faces are matched up.

A third aspect of the present invention is a method for fabricating a wooden member for covering a vehicle steering wheel, which method includes steps of: providing a wooden member original with a long form and including a bole thereinside which extends in a length direction, the wooden member including a cross-section perpendicular to the length direction which is substantially a rectangle of which corner portions have been chamfered; and compression-deforming the wooden member original in directions toward a center of the cross-section, for making an outer periphery of the wooden member original an arc surface.

DETAILED DESCRIPTION OF THE INVENTION

An embodiment of the wooden member fabrication process of the present invention will be described with reference to the drawings.

Figure 3:
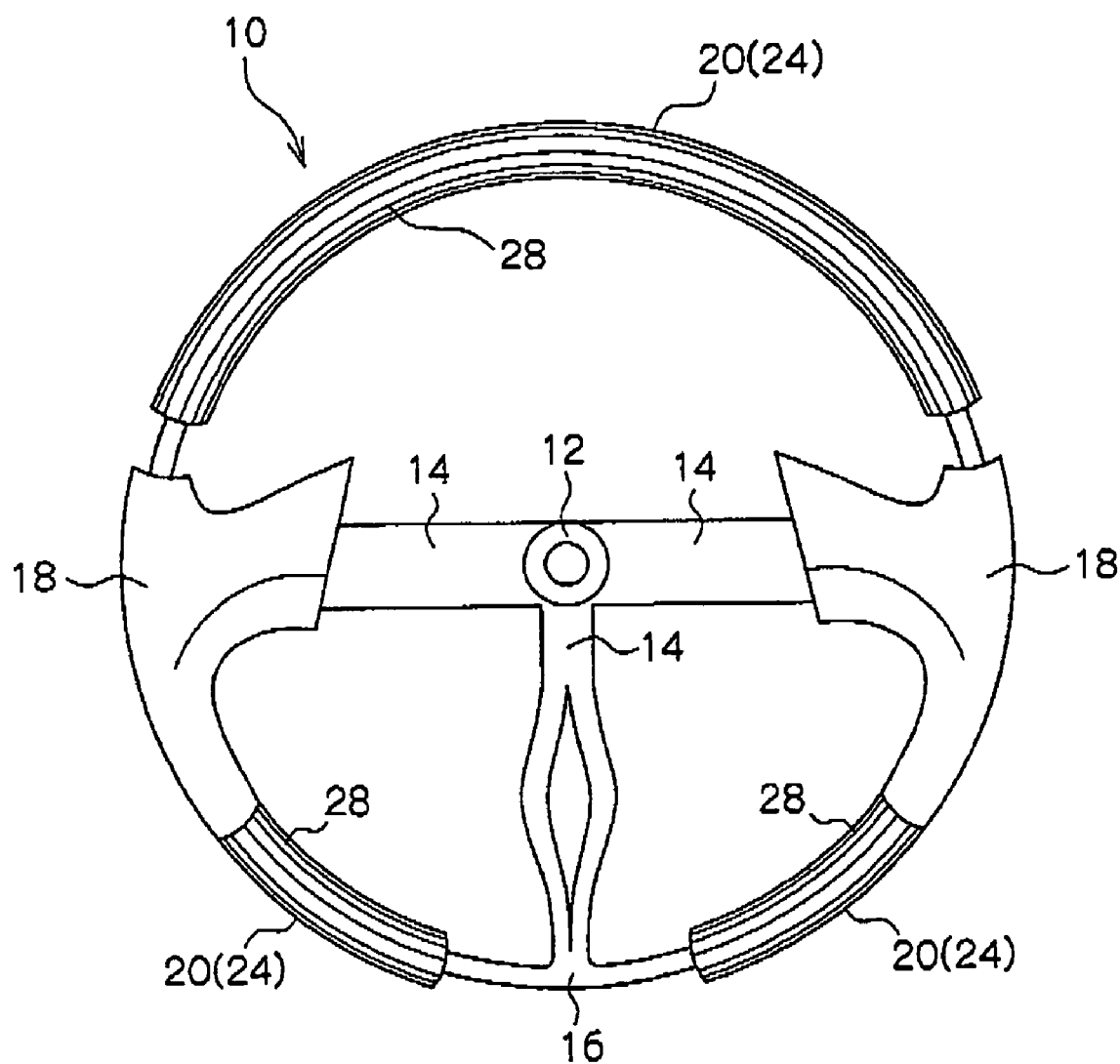
FIG. 3 is a plan view showing a steering wheel relating to the embodiment of the present invention.

FIG. 3 shows a front view of a steering wheel 10. This steering wheel 10, which is used in a vehicle, is a "wood-covered steering wheel". This steering wheel 10 is equipped with a boss portion 12, and this boss portion 12 is fixed to a steering shaft (not shown) of the vehicle. A plurality (three in the present embodiment) of ends of spoke portions 14 are joined to the boss portion 12. The plurality of spoke portions 14 extend downward, rightward and leftward, respectively, from the boss portion 12.

A core 16 made of metal (for example, magnesium), which serves as a wheel ring, is fixed at distal ends of the respective spoke portions 14. As shown in FIG. 3, the core 16 has an annular form in front view. The core 16 is disposed frontward of a driving seat. Rigidity of the steering wheel 10 is assured by this core 16. Leather-wrapped portions 18 are provided at a right side portion and a left side portion of the steering wheel 10. The leather-wrapped portions 18 have structures in which leather covers resin surfaces. Each leather-wrapped portion 18 is set to a state which encloses a connection portion of the spoke portion 14 with the core 16, and the core 16 in a vicinity thereof. Thus, the leather-wrapped portions 18 are mounted at the spoke portions 14 and the core 16. The leather-wrapped portions 18 may have structures in which leather does not cover the resin surface (a structure with the resin alone).

Wooden members 20 are mounted at an upper portion, a diagonally lower-right portion and a diagonally lower-left portion of the steering wheel 10, for ornamentation or the like. Each of the wooden members 20 has a circular arc shape whose length direction is along a circumferential direction of the core 16. A raw material structuring the wooden members 20 may be, for example, a coniferous timber such as cedar, cypress, larch or the like, a deciduous timber such as beech, rosewood, walnut, birds eye maple or the like, or the like. As shown in FIG. 1C, a core hole 22 (in the form of a 'D' in this example) is formed passing through each of the wooden members 20. This core hole 22 is formed along the circumferential direction of the core 16 as shown in FIG. 3. As shown in FIG. 1C, each of the wooden members 20 is structured by a pair of wooden original pieces 24, which serve as the wooden member original in a form which has been cut in half. Of this pair of wooden original pieces 24, one wooden original piece 24 is disposed at a front face side (a vehicle occupant side) of the steering wheel 10 (see FIG. 3), and the other wooden original piece 24 is disposed at a rear face side (a side which is opposite to the occupant side) of the steering wheel 10. Further, core channels 26, which structure the core hole 22, are formed in the respective wooden original pieces 24.

Herein, the pair of wooden original pieces 24 are joined to one another, as shown in FIG. 1C, with an adhesive. Thus, the core channels 26 are combined with one another and the core hole 22 is formed. The core 16 is accommodated in this core hole 22. Thus, the wooden members 20 are assembled to the core 16.

Next, a fabrication process of the wooden members 20 will be described.

Figure 2A:
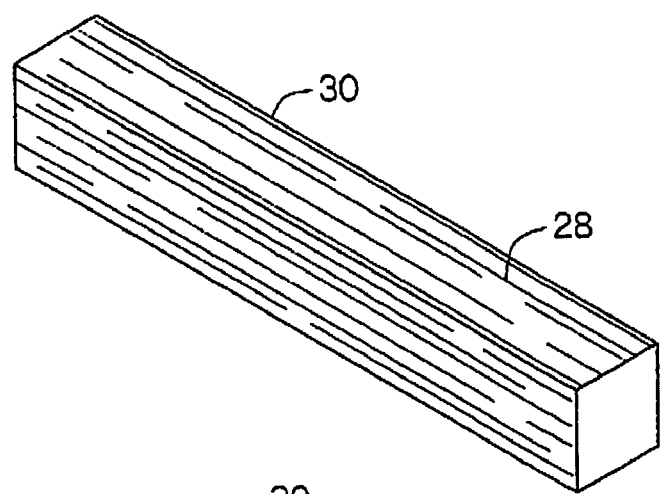
FIG. 2A is a view showing a portion of a process in the wooden member fabrication process relating to the embodiment of the present invention, and is a perspective view showing a wooden material original.
Figure 2B:
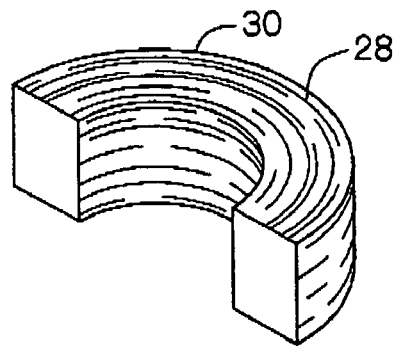
FIG. 2B is a view showing a portion of the same process, and is a perspective view showing the wooden material original after curving processing.

As shown in FIG. 2A, a wooden material original 30 (a virgin material such as natural wood), which has a rectangular column shape with grain 28 along a length direction thereof, serves as a raw material for the wooden members 20 (see FIG. 3). As shown in FIG. 2B, the wooden material original 30 is processed for bending and set to a circular arc form whose length direction will be along the circumferential direction of the core 16 (see FIG. 3).

Next, the circular arc form is preserved for a predetermined duration (for example, eight hours) at a high temperature (for example, 100° C.), and the circular arc form is fixed. Thereafter, the wooden material original 30 is cut into two (halves) in the thickness direction, along a cutting plane which passes along an axial central portion. Thus, as shown in FIG. 2C, the pair of wooden original pieces 24 is formed. Further, as shown in FIG. 2D, the core channels 26 are formed along the circumferential direction of the core 16 (see FIG. 3) in cross-sections of the respective wooden original pieces 24. These core channels 26 are, as shown in FIG. 1A, formed such that the core hole 22 is formed in a 'D' shape, in cross-sections which are perpendicular to the length direction, by an arc shape which is substantially circular about an axial center portion 25 and a rectangular channel.

Figure 1A:
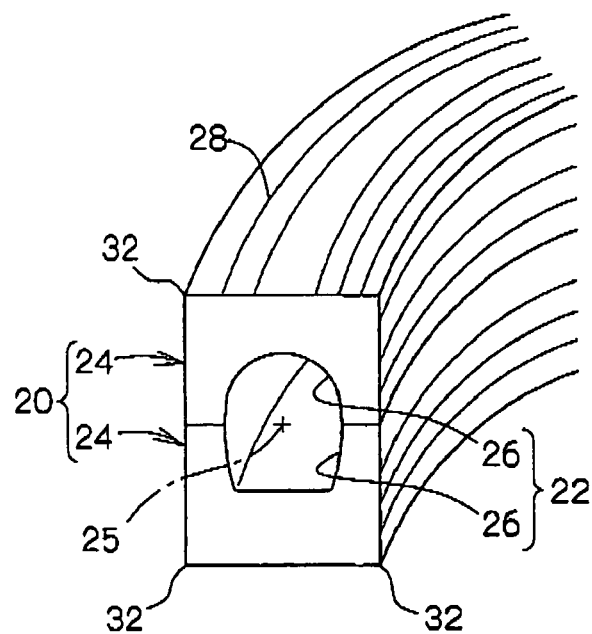
FIG. 1A is a view showing a portion of a process in a wooden member fabrication process relating to an embodiment of the present invention, and is a perspective view showing wooden original pieces in which core channels have been formed.
Figure 1B:
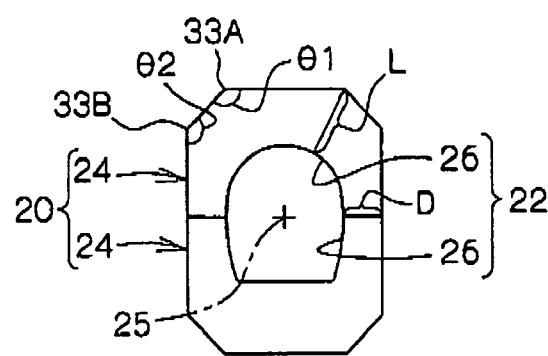
FIG. 1B is a view showing a portion of the same process, and is a sectional view showing a state in which corner portions of the wooden original piece have been chamfered.
Figure 1C:
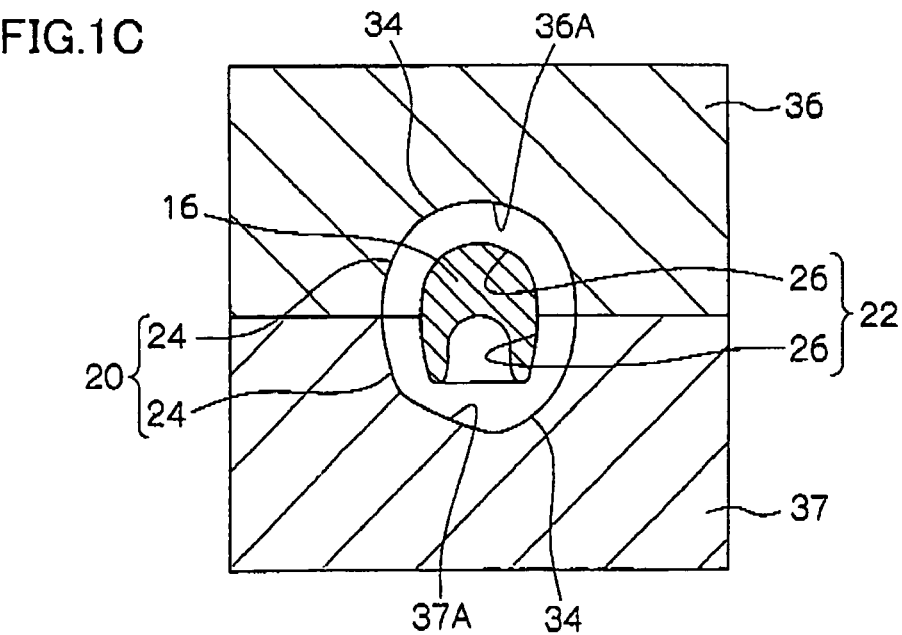
FIG. 1C is a view showing a portion of the same process, and is a sectional view of a mold and the wooden original piece which shows a state of press-processing.
Figure 2C:
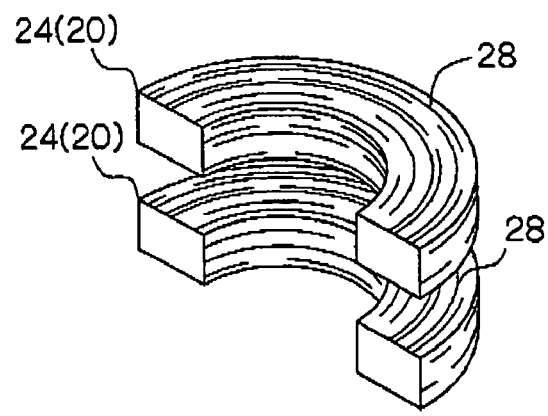
FIG. 2C is a view showing a portion of the same process, and is a perspective view showing a state in which the wooden material original has been cut into a pair of wooden original pieces by a cutting process.
Figure 2D:
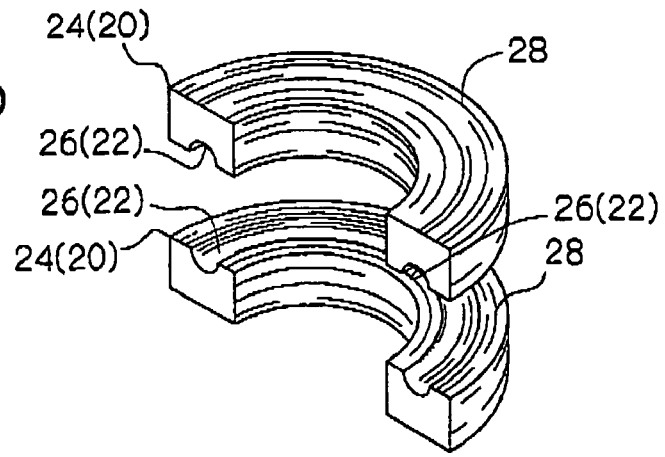
FIG. 2D is a view showing a portion of the same process, and is a perspective view showing a state in which the core channels have been formed in both of the wooden original pieces by a channel formation process.

The wooden original pieces 24 that are processed in this manner are, as shown in FIG. 1A, provided with right-angled corner portions 32 in cross-section. These corner portions 32 are, as shown in FIG. 1B, removed by a subsequent trimming process. Because the trimming of these corner portions 32 is implemented along the direction of the grain, the trimming can be implemented comparatively easily, and there is little risk of cracking in directions other than the trimming direction. At this time, obtuse angle portions 33A and 33B are newly formed by the removal of the corner portions 32. Angles θ1 and θ2 of the obtuse angle portions 33A and 33B may be made to be 100°<θ1<170° and 100°<θ2<170°, may be preferably made to be 110°<θ1<160° and 110°<θ2<160°, and may be even sore preferably made to be 120°<θ1<150° and 120°<θ2<150°. Consequently, thicknesses in radial directions from the axial center portion 25, in cross-sections perpendicular to the length direction of the wooden original pieces 24, are made substantially equal.

In the present embodiment, as a result of the thicknesses in the radial direction from the axial center portion 25 being substantially equal, at an upper of the wooden original pieces 24, a dimension of a maximum thickness portion L is approximately 1.82 times a dimension of a minimum thickness portion D. Furthermore, this ratio is substantially the same at the lower of the wooden original pieces 24. However, it is sufficient that this ratio is not more than 1.85, and the ratio may preferably be made to be not more than 1.60, and may even more preferably be made to be not more than 1.40. Because the ratio of the dimension of the largest thickness portion L to the dimension of the smallest thickness portion D is 1.85 or less, cracking of the wooden original pieces 24 during compression can be avoided. That is, if the ratio exceeded 1.85, then if a location at which a maximum force was applied when the largest thickness portion L and the like were compressed was the smallest thickness portion D, cracking would be likely to occur at that portion. However, if the ratio is not more than 1.85, as in the present embodiment, this problem can be avoided.

Next, as shown in FIG. 1C, this pair of wooden original pieces 24 is processed by pressing, and curved portions 34 are formed. In this process, molding dies 36 and 37, which are divided in two along the length direction, are employed. At these molds 36 and 37, inner peripheral walls 36A and 37A are formed with substantially circular arc shapes in cross-sections perpendicular to the length direction. When the molds 36 and 37 are brought into contact with one another, the molds 36 and 37 as a whole form a tube shape. A handgrip is inflected in a wave-form, in which protruded portions and recessed portions are continuous with one another, along the length direction. Of the inner peripheral wall 37A of the mold 37, a lower left portion in FIG. 1C is a recess-form portion of the handgrip, which is to say a portion which corresponds to a slightly sunken recessed portion of the handgrip (not shown) and has a very large radius of curvature in cross-section in comparison with other portions. Here, although not shown in the drawings, portions at the inner peripheral wall 37A of the mold 37 that correspond to the wheel handgrip are inflected in the wave pattern in which the protruded portions and recessed portions are continuous with one another. Portions at the inner peripheral wall 37A of the mold 37 that correspond to the protrusion-form portions of the handgrip (that is, the unillustrated protruded portions) have a smaller radius of curvature in cross-section than the portions corresponding to the recess-form portions. At these portions, cross-sections of the inner peripheral walls 36A and 37A which are perpendicular to the length direction have elliptical shapes as a whole. Note that, although the molds 36 and 37 are employed to give part of the wooden original pieces 24 the form of a handgrip in the present embodiment, the molds 36 and 37 are not limited thus. The molds 36 and 37 that are employed may be set to an overall elliptical shape or circular shape of the inner peripheral walls 36A and 37A at any of the cross-sections perpendicular to the length direction. The molds 36 and 37 are operated by an unillustrated drive source (for example, a hydraulic cylinder), and can be separated in accordance with operation thereof.

Now, the core 16 is disposed between the pair of wooden original pieces 24, and the core 16 is set in the molds 36 and 37 by placing the wooden original pieces 24 in which the core 16 is disposed on the mold 37, which is the lower of the molds 36 and 37. At this time, an adhesive is interposed between faces of the pair of wooden original pieces 24 that will match up to one another. Next, by applying pressure from above and below to outer peripheral faces of the wooden original pieces 24 via the molds 36 and 37, the wooden original pieces 24 are compressed as a whole and the curved portions 34 are formed. At this time, locations at which maximum forces are applied have thickness in a direction perpendicular to the compression direction, and are the smallest thickness portions D, which are portions at which the wooden original pieces 24 match up with one another. However, because the ratio of the dimension of the largest thickness portion L to the dimension of the smallest thickness portion D prior to compression is not more than 1.85, the occurrence of cracking can be avoided. It is necessary to preserve this pressured state for a predetermined duration (about 1 to 30 minutes). When the molds 36 and 37 are opened up thereafter, the core 16 which is covered with the wooden member 20 can be provided. Strength of the wooden member 20 is increased by the compression, and the wooden member 20 is less susceptible to damage. Thereafter, the wooden member 20 is coated by a coating device in order to make the outer periphery more glossy or the like.

Anyway, in the present embodiment, the dimension of the largest thickness portion L of the wooden original piece 24 before processing is approximately 1.82 times the dimension of the smallest thickness portion 1), and a ratio of the same portions after processing is approximately 1.20. Thus, when dimensions of a portion that was the largest thickness portion L and a portion that was the smallest thickness portion D are compared, if the dimension of the portion that was the smallest thickness portion D is taken to be 1, the ratio of the dimension of the portion that was the largest thickness portion L is smaller than the pre-processing ratio of the dimension of the largest thickness portion L to the dimension of the smallest diameter portion D.

Further, in the present embodiment, the dimension of a portion at which the thickness is largest after processing is approximately 1.65 times the dimension of a portion whose thickness is smallest after processing. Thus, a dimensional ratio of the dimension of the portion whose thickness is largest after processing to the dimension of the portion whose thickness is smallest after processing need not necessarily be 1:1.

Next, operation of the embodiment described above will be described.

As shown in FIGS. 1A to 1C, the corner portions 32 of the wooden original pieces 24 are beveled and the wooden original pieces 24 are pressed. Therefore, because arc surfaces are formed at the outer periphery by compression-molding rather than by cutting alone, processing is simple and working characteristics can be improved. Herein, it is possible to make the portions to be compressed smaller by the simple operation of trimming the corner portions beforehand. At locations at which compression ratios are high, internal reactive forces due to the compression will be high, and shape deformation due to moisture absorption at these portions is likely to occur during use. However, in the present embodiment, because differences in compression ratios (differences in compression dimensions) around the axial center portion 25 of the wooden member 20 are smaller, shape deformation during use is suppressed. As a result, the wooden member 20 which is less susceptible to the occurrence of shape deformation due to moisture absorption can be provided without adversely affecting working characteristics.

Further, because differences between compression ratios are small, variations in density of the wood due to differences in compression ratios can be made smaller, and the wooden member 20 can be made substantially uniform in overall color tone. As a result, quality of appearance, tactile impression and the like can be improved, and the wooden member 20 can be provided with excellent design characteristics.

Note that, in the embodiment described above, an example has been specifically described in which the wooden material original is processed for bending to the circular arc shape along the circumferential direction of the core. However, other processes, such as, for example, cutting a wooden material original to a circular arc shape along a circumferential direction of a core or the like are also possible, and the present invention is not limited thus.

Furthermore, in the embodiment described above, two wooden original pieces are employed for the compression processing. However, it is possible to employ, for example, one wooden original piece for the compression processing, and the present invention is not limited thus. Further yet, although an example in which the wooden member is structured by a pair of wooden original pieces has been specifically described, the wooden member could be structured by one or by three or more wooden original pieces, and the present invention is not limited thus.

Further still, in the embodiment described above, an example of a case in which wooden members are provided at an upper portion, a diagonally lower-right portion and a diagonally lower-left portion of a steering wheel has been specifically described. However, wooden members may be provided at any portions of a steering wheel, or a wooden member may be provided at the whole of the periphery of a steering wheel, and the present invention is not limited to the embodiment described above.

Further again, in the embodiment described above, an example of a case in which the core has a substantial 'U' shape in a cross-section perpendicular to the length direction has been specifically described. However, the cross-section may be, for example, an elliptical form, an 'H' shape or the like, and any cross-sectional form may be implemented.

Now, in the embodiment described above, an example of a case of fabricating a wooden member for a steering wheel has been described. However, according to the present invention as recited in claims 1, 3 and 4, the present invention may be applied to cases of fabricating wooden members for, for example, shift lever knobs, lever combination switch knobs, window regulator panels and the like, and is not limited to cases of fabricating wooden members for steering wheels.

As described above, according to the wooden member fabrication method of the present invention, there are excellent effects in that it is possible, by a simple process, to achieve greater stability of form and uniformity of color tone subsequent to processing.

What is claimed is:

1. A wooden member fabrication method comprising the sequential steps of:

providing a wooden member original with a long form and including a hole inside which extends in a length direction, the wooden member including a cross-section perpendicular to the length direction which is substantially a rectangle having corner portions; chamfering said corner portions of the wooden member such that said wooden member has a polygonal cross-section for avoiding breakage of the wooden member during a compression deforming step; and compression-deforming the chamfered wooden member original in directions toward a center of the cross-section, for making an outer periphery of the wooden member original an arcuate surface.

2. The wooden member fabrication method of claim 1, wherein the wooden member original includes thicknesses in the cross-section which are constrained to a predetermined range.

3. The wooden member fabrication method of claim 1, wherein the step of providing the wooden member original comprises the step of chamfering the corner portions of the cross-section for constraining thicknesses of the wooden member original to a predetermined range.

4. The wooden member fabrication method of claim 1, wherein the wooden member original is structured by two segments which are divided by a plane along the length direction, a channel being formed at the plane of division of each segment, which channel extends in the length direction, for forming the hole.

5. The wooden member fabrication method of claim 1, wherein a core is disposed in the hole.

6. The wooden member fabrication method of claim 1, wherein in the cross-section, angles at portions which are chamfered are at least 120° and at most 150°.

7. The wooden member fabrication method of claim 1, wherein in the cross-section, a thickness dimension of a largest portion is at most 1.85 times a thickness dimension of a smallest portion.

8. The wooden member fabrication method of claim 1, wherein the wooden member original includes a shape which is curved in the length direction.

9. The wooden member fabrication method of claim 1, wherein the wooden member original is to be used for covering a steering wheel of a vehicle.

10. The wooden member fabrication method of claim 1 wherein the thicknesses are defined by dimensions of thickness of the wooden member original along straight lines from a substantial center of the cross-section toward any location at the outer periphery of the cross-section.

11. A wooden member fabrication method comprising the sequential steps of:

provideing a wooden member original with a long form and including a substantially rectangular cross-section;

dividing the wooden member original into two segments by a plane which passes along a length direction through a substantial center of the cross-section;

forming, at a divided face of each of the two segments, a channel which extends along the length direction;

chamfering corner portions of the wooden member original along the length direction such that said cross-section is polygonal, wherein said chamfering step constrains thicknesses of the wooden member original to within a predetermined range such that in the cross-section, a thickness dimension of a largest portion is at most 1.85 times a thickness dimension of a smallest portion for avoiding breakage of the wooden member during a compression deforming step; and pressing and joining the two segments such that the divided faces are matched up.

12. The wooden member fabrication method of claim 11, further comprising the step of, before the step of pressing the two segments, disposing a core in the channel of one of the segments.

13. The wooden member fabrication method of claim 11, wherein in the cross-section, angles at portions which are chamfered are at least 120° and at most 150°.

14. The wooden member fabrication method of claim 11, wherein the wooden member original includes a curve in the length direction.

15. The wooden member fabrication method of claim 11, wherein the wooden member is to be used for covering a steering wheel of a vehicle.

16. The wooden member fabrication method of claim 11, wherein the thicknesses are defined by dimensions of thickness of the wooden member original along straight lines from a substantial center of the cross-section toward any location at the outer periphery of the cross-section.

17. A method for fabricating a wooden member for covering a vehicle steering wheel, the method comprising the sequential steps of:

providing a wooden member original with a long form and including a hole inside which extends in a length direction, the wooden member including a cross-section perpendicular to the length direction which is substantially a rectangle, chamfering corner portions of said rectangular cross-section such that in cross-section, a thickness dimension of a largest portion is at most 1.85 times a thickness dimension of a smallest portion for avoiding breakage of the wooden member during a compression deforming step, wherein the thicknesses are defined by dimensions of thickness of the wooden member original along straight lines from a substantial center of the cross-section toward any location at the outer periphery of the cross-section, and wherein the angles at portions which are chamfered are at least 120° and at most 150°; and compression-deforming the wooden member original in directions toward a center of the cross-section, for making an outer periphery of the wooden member original an arcuate surface.

18. The fabrication method of claim 17, wherein the wooden member original is structured by two segments which are divided by a plane along the length direction, a channel being formed at the plane of division of each segment, which channel extends in the length direction, for forming the hole.

* * * * *